United States Patent [19]

Newman et al.

[11] Patent Number: 4,810,541
[45] Date of Patent: Mar. 7, 1989

[54] PLASTIC CONTAINER HAVING A SURFACE TO WHICH A LID MAY BE PEELABLY SEALED

[75] Inventors: Frederick C. Newman, Weston, Conn.; Louis J. Marsella, Fremont, Calif.

[73] Assignee: Continental Can Company, Inc., Norwalk, Conn.

[21] Appl. No.: 125,970

[22] Filed: Nov. 27, 1987

[51] Int. Cl.$^4$ .............................................. B65D 41/00
[52] U.S. Cl. ..................... 428/36.7; 220/354; 220/453; 428/192; 428/516; 428/517; 428/518; 428/519; 428/35.7
[58] Field of Search ................. 428/35, 516, 517, 518, 428/519, 192; 220/359, 453

[56] References Cited

U.S. PATENT DOCUMENTS

| | | | |
|---|---|---|---|
| 3,879,492 | 4/1975 | Bontinick | 524/525 |
| 4,189,519 | 2/1980 | Ticknor | 428/476.1 |
| 4,448,348 | 5/1984 | Helms | 220/359 |
| 4,605,142 | 8/1986 | Itoh et al. | 220/359 |
| 4,666,778 | 5/1987 | Hwo | 428/412 |

Primary Examiner—Ellis P. Robinson
Assistant Examiner—James J. Seidleck
Attorney, Agent, or Firm—Paul Shapiro

[57] ABSTRACT

A plastic container adapted to be peelably heat sealed with a lid, the container having an integral peripheral flange extending outwardly from its upper edge to which the lid may be peelably heat sealed, the lid contacting surface of the flange being comprised of a peel mixture of polyethylene, and ethylene/vinyl acetate copolymer and a butene-1 polymer.

8 Claims, 1 Drawing Sheet

PLASTIC CONTAINER HAVING A SURFACE TO WHICH A LID MAY BE PEELABLY SEALED

BACKGROUND OF THE INVENTION

1. Field of the Invention

This invention relates to plastic containers to which a lid may be peelably sealed.

2. The Prior Art

The art has under consideration containers for the packaging of oxygen-sensitive foods intended for storage under non-refrigerated conditions. These containers are formed from multilayer sheets constructed of an inner barrier layer, juxtaposed adhesive layers on both sides of the barrier layer and outer layers of a polyolefin. For example, British Pat. No. 1,379,106 discloses a five-layer sheet comprised of an inner gas barrier layer formed of a copolymer of vinylidene chloride and vinyl chloride, an ethylene/vinyl acetate copolymer adhesive layer on either side of the barrier layer and an outer layer of a polyolefin such as polyethylene, polypropylene or ethylene/propylene copolymer. The multilayer sheets are disclosed as being ideally suited for making containers of a variety of forms for products that are sensitive to oxygen.

The multilayer sheets of the prior art are conventionally made in a single process step by coextruding two or more polyolefinic layers and intermediate layers comprised of an adhesive tie layer material into a continuous sheet to form a unitary structure. In the case of multilayer gas barrier sheets, an inner layer of a gas barrier material is coextruded with the polyolefinic and adhesive layers.

A multilayer sheet structure having gas barrier properties which has been found particularly suitable for the manufacture of plastic containers used for the packaging of oxygen sensitive food products is constructed of an inner gas barrier layer such as ethylene vinyl alcohol (EVOH) or vinylidene chloride polymer (SARAN), first and second adhesive tie layers applied to each side of the barrier layer, a first outer layer of low or high density polyethylene, bonded to the first adhesive layer and a propylene polymer or styrene polymer layer bonded to the second adhesive layer.

Containers thermoformed from such multilayer gas barrier sheet are utilized in the packaging of oxygen-sensitive food products which are intended for storage under non-refrigerated conditions. In such application, the containers are formed using a sterile multilayer gas barrier film, and while in a still heated state from the forming station are filled with sterile food product in a filling station inside a sterile enclosure. The filled containers are then heat sealed without it being possible for their contents to be contaminated by a non-sterile atmosphere with a lid sheet whereof at least the side of the lid facing the inside of the containers is composed of a heat activatable thermoplastic material which is sterile.

Multilayer sheets of the non-barrier and gas barrier type are converted to containers using conventional thermoplastic forming techniques such as thermoforming. In thermoforming, the multilayer sheet material is thermoformed by feeding the sheet from roll stock past a heating station where the sheet is heated, usually by passage through an oven or overhead radiant heaters or a combination of both and the heated sheet passes directly to a thermoforming machine which forms the container. Any suitable thermoforming technique such as vacuum forming, pressure forming, plug assist or mechanical forming or any combination of such techniques can be used in the forming of the containers but in all cases the sheet material is preheated generally to temperature of about 375° F. to about 425° F. to effect a degree of softening of the multilayer sheet so that it can be easily thermoformed into containers having uniform sidewalls of the desired thickness.

In recent years the food packaging industry has shown intense interest in plastic containers formed from multilayer sheet of the types described above which can be hermetically sealed with a lid which is readily peelable from the container without tearing or rupturing of the packaging materials. Thus as a simple matter of convenience, it is desirable that the sealed container be openable by manually pulling the lid from the container instead of relying on a knife, scissors or tear tab to open the package.

To effect peelability it is normally required that an intermediate, peelable layer be placed between the container surface and the opposed lid surface. One of the disadvantages encountered in such peel systems is that upon the removal of the lid from the container surface, the phenomenon of "legging" occurs, i.e., multiple strands of the peel layer form between the lid and container surface as the lid is peeled from the container. Legging is unattractive and there exists the possibility of the strand material's falling into and contaminating the food product. Also, this application of a peel layer to the lid or container surface is a costly manufacturing procedure. It would therefore be highly advantageous if the peel layer were an integral part of the container to which a lid could then be directly hermetically and peelably sealed.

SUMMARY OF THE INVENTION

According to the present invention there is provided a plastic container for food and other perishable products to which a lid may be peelably sealed wherein the container has an integral, peripheral flange extending outwardly from the upper edge of the container, the lid contact surface of the flange being comprised of a peel layer composition comprised of a mixture containing from (1) to about 40 to about 60 percent by weight polyethylene (2) about 30 to about 45 percent by weight of an ethylene/vinyl acetate copolymer containing about 80 to about 98 percent by weight ethylene and about 2.0 to about 20 percent by weight vinyl acetate and (3) about 8 to about 28 percent by weight of a butene-1 polymer.

Surprisingly, it has been found that the incorporation of about 40 to about 60 percent by weight polyethylene to a blend of a butene-1 polymer and an ethylene/vinyl acetate copolymer produces a peelable contact surface whereby legging is substantially eliminated when a heat-sealed lid is removed from such surface.

The plastic containers of the present invention can be peelably and hermetically sealed with a lid having a heat activable sealing surface such as polyethylene.

In mechanical abuse tests, hermetically and peelably heat sealed containers of the present invention were found to withstand accidental opening under conditions which satisfy U.S. Department of Agriculture (USDA) mechanical abuse specifications for food containers.

DETAILED DESCRIPTION OF THE INVENTION

The term "polyethylene" includes with in its meaning low, medium and high density polyethylene having a density in the range of 0.915 to 0.96 g/cc.

The term "ethylene/vinyl acetate copolymer" includes within its meaning a copolymer of ethylene and vinyl acetate. The ethylene/vinyl acetate component of the peelable layer of the container of the present invention may contain from about 80.0 to about 98.0 percent by weight ethylene and about 2 to about 20 percent by weight vinyl acetate and preferably about 94 to about 97 percent by weight ethylene and about 3 to about 6 percent by weight vinyl acetate.

The term "butene-1 polymer" includes within its meaning butene-1 homopolymer and butene-1/ethylene copolymers containing about 2 to about 10 percent by weight ethylene and preferably between about 3 to about 6 percent by weight ethylene based on the weight of the butene-1/ethylene copolymer. The butene-1 polymers have a melt index of between 0.1 and about 3.0 decigrams/minute and preferably about 1.0 decigrams per minute.

The term "styrene polymer" includes the vinyl aromatic or styrenic polymers including substituted and unsubstituted styrene polymers and copolymers and high impact polystyrenes comprised of styrene/rubber blends and copolymers. A high impact styrene polymer available commercially under the trade mark designation Mobil 4600 having a melt flow of about 2.7 g/10 min. (ASTM test method D1238) has been found suitable as the styrene layer in the mulitlayer sheet constructions of the present invention. Generaly high impact styrene polymers useful in the practice of the present invention have a melt flow in the range of about 1.5 to about 3.0 g/10 min. (ASTM test method D1238), and preferably about 2.0 to about 2.8 g/10 min.

The term "propylene polymer" includes within its meaning polypropylene and propylene-ethylene copolymers.

In preparing the outer peel layer composition used in the containers of the present invention, the polyethylene, ethylene/vinyl acetate copolymer and butene-1 polymer are admixed to prepare a blend comprised of about 40 to about 60 percent by weight polyethylene, preferably about 45 to about 55 percent by weight, about 30 to about 45 percent by weight ethylene/vinyl acetate copolymer and preferably about 35 to about 42 percent by weight ethylene/vinyl acetate copolymer and about 8 to about 28 percent by weight, preferably about 15 to about 20 percent by weight of the butene-1 polymer.

Advantageously in preparing the peel layer composition used in the containers of the present invention there may be included in the composition a small but effective amount, for example, about 0.05 to about 0.15 percent by weight, of an antiblock agent, such as silica and a small but effective amount, e.g., about 0.1 to about 0.5 percent by weight, of a slip additive, such as a primary amide such as an oleamide.

To prepare a plastic container having reduced permeation to gases, there is incorporated in the multilayer sheet structure from which the container is fabricated a layer of an extrudable gas barrier synthetic resin as an inner barrier layer.

A wide variety of extrudable barrier resins may be employed as the inner barrier layer in accordance with the present invention. Particularly suited as gas barrier layers are extrudable vinylidene chloride polymers, wherein the polymers contain at least 70 weight percent vinylidene chloride, the remainder being one or more ethylenically unsaturated monomers copolymerizable therewith such as vinyl chloride. Ethylene vinyl alcohol copolymers are derived from hydrolyzed ethylene vinyl acetate copolymers containing from 15 to 65 mole percent ethylene and 85 to 35 mole percent of vinyl acetate.

Multilayer gas barrier sheet useful in the preparation of plastic containers in accordance with the practice of the present invention are generally comprised of an inner gas barrier layer, an outer layer comprised of a peel composition containing the polyethylene/ethylene vinyl acetate copolymer/butene-1 polymer blend, a polyethylene layer directly bonded to one surface of the peel layer and adhesively bonded to one face of the barrier layer and a styrene or propylene polymer adhesively bonded to the other surface of the barrier layer.

In constructing the multilayer sheet from which the plastic containers of the present invention are fabricated, the outer peel layer may be aout 1 to about 5 mils thick and preferably about 3 to 4 mils thick, the inner barrier layer may be about 2 to about 10 mils in thickness and most advantageously from about 3 to about 5 mils thick, the polyethylene layer intermediate the peel layer and barrier layer may be about 2 to about 5 mils thick and preferably 3 to 4 mils thick and the styrene or propylene polymer layer may be from about 2 to about 10 mils in thickness and preferably about 4 to about 6 mils in thickness.

In constructing the multilayer barrier sheet from which the containers of the present invention are fabricated the outer peel layer may be directly bonded to the polyethylene layer, the polyethylene layer, inner barrier layer and styrene or propylene polymer layers being bonded by interposed layers of a suitable adhesive. The adhesive layers may vary in thickness from about 0.5 to about 2 mils, however, generally the preferred thickness of any adhesive layer is about 0.9 to about 1.2 mils.

A wide variety of polymers and polymeric compositions are useful as adhesive layers to provide adhesion between the various layers of the sheet. Suitable polymers or polymeric compositions which may be employed are copolymers of ethylene and vinyl acetate, advantageously in proportions of from 14 weight percent to 40 weight percent vinyl acetate with from 86 weight percent to 60 weight percent ethylene, and copolymers of ethylene with isobutyl acrylate, advantageously in proportions of from 10 to 30 weight percent isobutyl acrylate with from 80 to 70 weight percent of ethylene.

Containers are manufactured from the multilayer sheet, to which the desired shape is imparted, for example, by thermoforming. The container bodies generally possess a base and a sidewall which extends upward from this base. The containers are hermetically sealed by means of a protective cover or lid. For this purpose, the sidewall of the container terminates at its upper end in a radially outwardly directed flat flange having an exposed surface which is comprised of the polyethylene ethylene-vinyl acetate copolymer/butene-1 polymer peel composition, the lid being placed flat on the flange surface and sealed under high pressure (e.g. 30–50 psi) and high temperature (e.g. 300°–350° F.).

Lid materials suitable for hermetically sealing the container generally consist of aluminum foil coated on its flange contact side with a heat activatable thermoplastic film layer such as polyethylene which allows the foil to be peelably heat sealed to the flange.

Heating sealing of the thermoplastic resin coated aluminum foil lid to the container flange is generally sufficient to ensure that the package remains hermetically sealed during normal handling and during transportation and storage.

BRIEF DESCRIPTION OF THE DRAWINGS

In the drawing which is attached hereto and made a part of this specification.

DETAILED DESCRIPTION OF THE DRAWINGS

Figure 1:
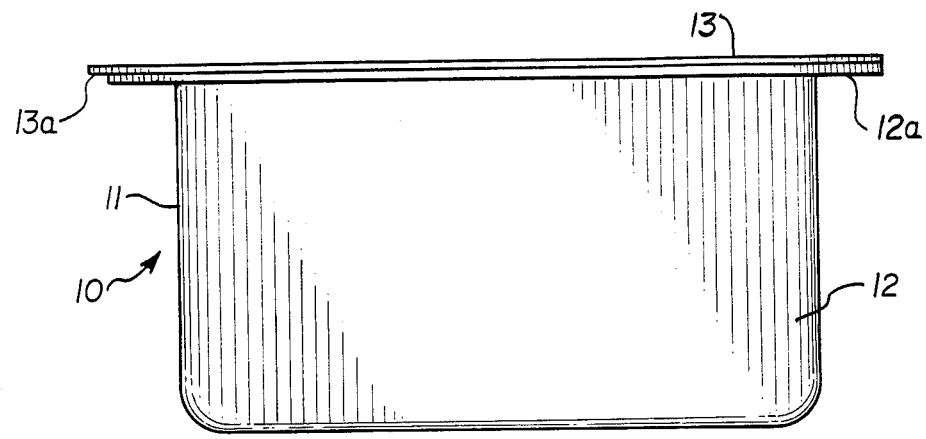
FIG. 1 is a side elevation of a container of the type that may advantageously be peelably sealed according to the present invention.

As shown in FIG. 1 of the drawing, the present invention is embodied very generally in a container 10 having an individual multilayer cup 11 with a central chamber 12 and an outwardly turned horizontal flange 12a to which is heat sealed lid 13.

Figure 2:
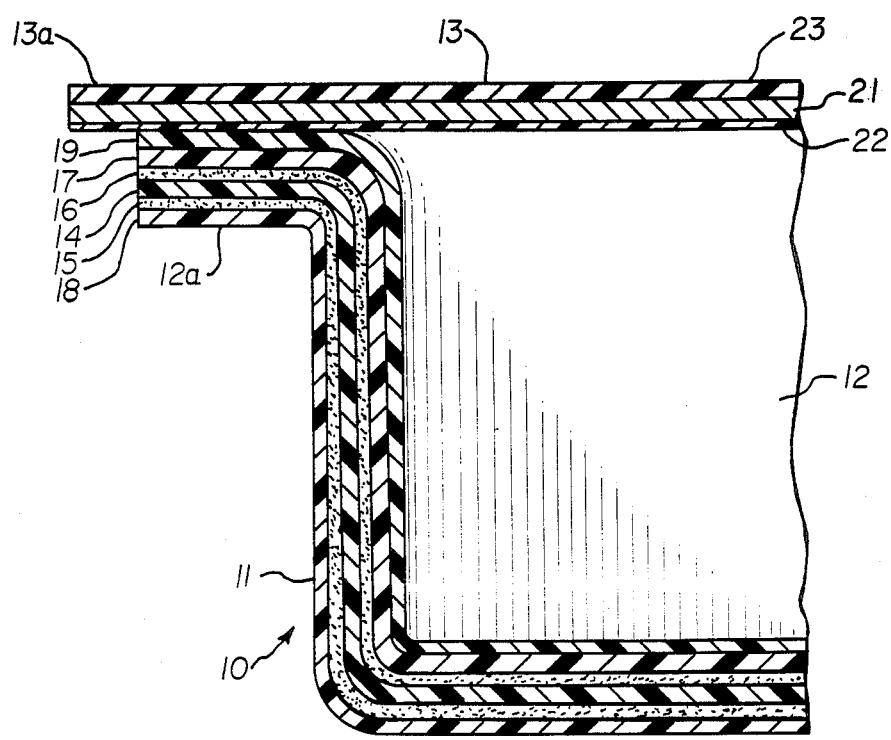
FIG. 2 is a partial section in exaggerated detail showing the various layers of the laminated container structure as well as the surfaces sealed according to the present invention.

In FIG. 2, a partial section of the container 10 is shown wherein the cup 11 is molded from a multilayer sheet structure. Lid 13 hermetically seals the cup 11. A portion of the lid extends beyond the flange 12a to form a gripping tab area 13a so that the tab can be gripped between the fingers and peeled away from the flange 12a to open the container.

The multilayer structure of the cup 11 is comprised of inner gas barrier core layer 14, thermoplastic adhesive layers 15, 16 juxtaposed on each side of the barrier layer 14, intermediate polyethylene layer 17 and outer styrene or propylene outer layer 18 which are each secured to each of the adhesive layers 15 and 16, and a continuous coherent peel seal layer 19 comprised of a blend of polyethylene, ethylene/vinyl acetate copolymer and butene-1 polymer, the peel seal layer 19 forming the interior, food contact surface of the cup 11 as well as the sealing surface of the flange 12a.

The total thickness of the multilayered sheet structure from which the cup 11 is molded ranges in thickness from about 15 to about 70 mils thickness and preferaly about 18 to about 60 mils thickness. The peel seal layer 19 is about 2 to 5 mils thick, the styrene or propylene polymer layer 18 about 2 to 10 mils thick, the polyethylene layer 17, about 2 to 5 mils thick, the gas barrier layer 14 about 3 to about 4 mils thick and the adhesive layers 15, 16 about 1.0 mil thick.

Heat sealed to the cup 11 through the peelable seal layer 19 is lid 13 which is constructed of an aluminum foil layer 21, a heat activatable polyethylene layer 22 juxtaposed on one side of the aluminum foil layer 21 and a polyethylene terephthalate layer 23 bonded to the other side of the aluminum foil. The total thickness of lid ranges from about 1.25 to about 7.0 mils thickness. The aluminum foil layer 21 can be about 1 to about 5 mils thick, the heat activatable polyethylene layer 22 about 0.1 to about 0.5 mils thick and the polyethylene terephthalate layer about 0.25 to 1.0 mils thick.

To hermetically seal the cup 11, the lid 13 is placed over the exposed peel seal layer 19 on the flange 12a of the cup 11, and heat and pressure are applied by the platens of a heat sealing device such as an induction heater, to form a hermetic seal. During the heat sealing operation, the peel seal layer 19 of flange 12a is bonded to the heat activatable polyethylene surface layer 22 of the lid 13.

Although the heat sealing operating results in an hermetically sealed container, the lid 13 can be readily and smoothly separated by hand without tearing of either the lid 13 or the flange 12a by grasping the lid 13 by tab 13a and peeling it off the flange.

In the manner described above plastic containers are obtained which, although hermetically sealed, are easily peelable open by hand by the user without recourse to scissors or other tools. The sealed containers although peelably openable, do not accidentally open when dropped from a height of 7 feet or more.

The invention is illustrated by the following Example.

EXAMPLE

A multilayer sheet was prepared by coextrusion of an inner barrier layer composed of about 82 weight percent vinylidene chloride and about 18 weight percent vinyl chloride, adhesive layers applied to opposite sides of the barrier layer comprised of an ethylene/vinyl acetate copolymer containing 28 weight percent vinyl acetate, a layer of a low density polyethylehne bonded to one surface of the barrier layer through an intermediate adhesive layer, a peel seal layer composed of a mixture of (1) 41 percent by weight low density polyethylene having a melt index of 5, (2) 41 percent by weight of an ethylene/vinyl acetate copolymer having a vinyl acetate content of 4.5 percent by weight and (3) 18 percent by weight Polybutene 1600 SA available from Shell Chemical Co., a butene-1/ethylene copolymer containing 3–6 percent by weight ethylene having a melt index of 1.0 the butene-1 polymer having incorporated therein 0.09 percent oleamide Keamide U (Trademark) available from Witco Chemical) slip additive and 0.3 percent silica antiblock agent available from Johns Manville under the trademark Superfloss directly bonded to the other surface of the low density polyethylene surface, and a high impact polystyrene composition having a melt flow of 2.7 g/min. adhered through an intermediate adhesive layer to the other surface of the barrier layer. The peel layer and low density polyethylene layers were each 3.6 mils thick, the inner barrier layer was 4.0 mils thick, the high impact polystyrene layer was 4.8 mils thick and the adhesive layers were each 1.0 mils thick. The molten polymers were coextruded from a conventional extruder through a flat sheet die, the melt streams being combined in a coextrusion block prior to being extruded from the die.

To prepare containers, the finished multilayer coextrudate was preheated to about 375° F. and thermoformed into flanged eight ounce cups having a sidewall thickness of 12-18 mils, with the peel layer forming the food contact side of the cup, using conventional thermoforming equipment.

A complementary lid was prepared by coating opposite surfaces of a 0.8 mil thick film of aluminum foil with a 0.5 mil thick coating of an ethylene/acrylic acid copolymer adhesive. During application of the adhesive, a 1.0 mil thick film of low-density polyethylene was extrusion laminated on one side of the adhesive coated aluminum foil and a 0.5 mil thick layer of polyethylene terephthalate extrusion laminated on the other side of the aluminum foil.

The lid was used to hermetically seal the flanged thermoformed cups filled with water by heat sealing the low density polyethylene laminated surface of the lid to the flanged surface of the cups. The lid/container assembly was placed between the jaws of a sealer and heat sealed at 310° F., 35 psi for 1.0 second.

The sealed cups filled with water exhibited excellent abuse strength, i.e., when subjected to a Drop Test, i.e. the sealed, filled cup being dropped from an inclined surface (15° angle) of 41 inches in length striking a base plate at a 90° angle to the direction of fall, the cups did not split, rupture or leak.

The lid was peeled from the container using an Instron tensile-testing machine whereby the lids were peeled at a rate of 10 inches/minute at an angle of 30° from the container. The peel values ranged from 2.0–2.5 lbs on peel propagation and a sustained peel of 0.7–0.9 lbs indicating an even controlled rate of shear. No legging was observed.

What is claimed is:

1. A plastic container adapted to be peelably heat sealed with a lid, the container having an integral peripheral flange extending outwardly from its upper edge to which a lid may be peelably heat sealed, the lid contacting surface of the flange being comprised of a peel mixture of (1) about 40 to about 60 percent by weight polyethylene, (2) about 30 to about 45 percent by weight of a copolymer of ethylene and vinyl acetate containing about 80 to about 98 percent by weight ethylene and about 2.0 to about 20.0 percent by weight vinyl acetate and (3) about 8 to about 28 percent by weight of a butene-1 polymer.

2. The container of claim 1 wherein there is incorporated in the butene-1 polymer about 0.05 to about 0.15 percent by weight of antiblock additive and about 0.1 to about 0.5 percent by weight of a slip additive.

3. The container of claim 2 wherein the antiblock additive is silica.

4. The container of claim 2 wherein the slip additive is a primary amide.

5. The container of claim 3 wherein the primary amide is an oleamide.

6. The container of claim 1 wherein the peel mixture is comprised of about 45 to about 55 percent by weight polyethylene, about 35 to about 42 percent by weight of the ethylene/vinyl acetate copolymer and about 8 to about 20 percent by weight of the butene-1 polymer.

7. The container of claim 1 wherein the container is formed from a multilayer sheet comprised of an inner gas barrier core layer, a polyethylene layer bonded to one surface of the barrier layer, a high impact polystyrene layer bonded to the other surface of the barrier layer and a layer of the peel composition bonded to the polyethylene layer, the peel composition layer forming the interior surface of the container.

8. The container of claim 7 wherein the barrier layer is a vinylidene chloride polymer.

* * * * *